Dec. 9, 1924.  1,518,740
J. B. HENDERSON
GYROCOMPASS
Filed Nov. 8, 1919
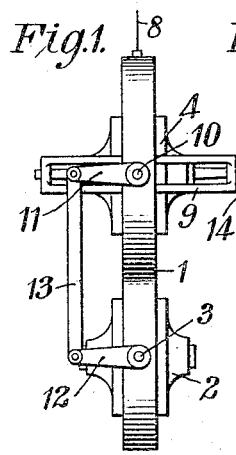
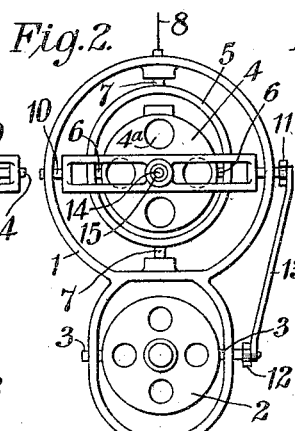
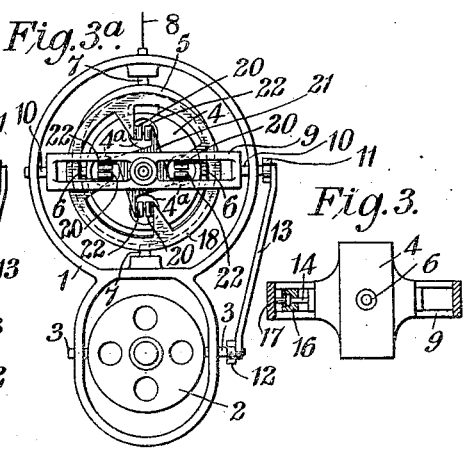
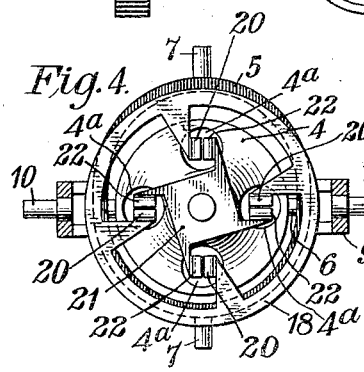
INVENTOR.
James Blacklock Henderson
BY
ATTORNEYS.

Patented Dec. 9, 1924.

1,518,740

UNITED STATES PATENT OFFICE.

JAMES BLACKLOCK HENDERSON, OF LEE, ENGLAND.

GYROCOMPASS.

Application filed November 8, 1919. Serial No. 336,625.

(GRANTED UNDER THE PROVISIONS OF THE ACT OF MARCH 3, 1921, 41 STAT. L., 1313.)

*To all whom it may concern:*

Be it known that I, JAMES BLACKLOCK HENDERSON, subject of the King of Great Britain, residing at 2 Cambridge Road, Lee, in the county of Kent, England, have invented certain new and useful Improvements in Gyrocompasses (for which I have filed an application in England, No. 14,754, Oct. 17, 1916), of which the following is a specification.

In a copending application Serial No. 130,407 filed November 9, 1916, I have described a gyro-compass in which two gyroscopes are used with their rotors revolving in opposite senses, but both in stable equilibrium as compasses. I also described how the relative motion and the common precessional motion of the two gyroscopes constituting the oscillation of the compass may be damped out by keeping the two gyroscopes approximately in phase with each other, that is, with the two rotor axes in the same altitude and the same azimuth, by means of the friction couple which is introduced when the rotor spindle of one of the gyroscopes is allowed to come in contact with some part connected to the other gyroscope. In such an arrangement power is taken from one of the gyroscope rotors during the interaction of the two gyroscopes and the friction couples acting on the two gyros are equal and opposite.

The object of this invention is to provide an improved method for damping two gyrocompasses generally, for example, one in which one of the gyros is maintained in stable equilibrium as a compass, as by means of a weight attached to the bottom of its rotor casing, and the other in unstable equilibrium as a compass, as by means of a weight attached to the top of its rotor casing.

I have found that in damping two gyro compasses by utilizing the mutual interaction of the gyros upon relative displacement so that power is taken from one or other of the rotors, it is necessary to produce unequal couples on the two gyros if both the relative and mutual periods of oscillation are to be effectively damped. My invention therefore consists in a gyro compass comprising two mutually interacting gyroscopes in which the mutual and relative periods of oscillation are both damped by unequal couples on the two gyroscopes produced by power taken from one or other of the two gyro rotors and controlled by their relative motions.

In the accompanying drawings, Figs. 1 and 2 show two elevations of an arrangement of damping similar to that described in my copending application referred to above in which the spindle of one gyro engages in a hole in a ring attached to the other gyro.

Fig. 3 is an elevation of the upper gyro with the ring shown in section.

Fig. 3ª is an elevation, showing the air vane structure in combination with the general arrangement of the parts;

Figs. 4 and 5 show an elevation and a plan on an enlarged scale, of the arrangement of the air responsive parts of Fig. 3ª by which the interaction between the gyros is brought about by the air currents created by one of the gyro rotors.

Figs. 6 and 7 show an elevation and plan respectively of an arrangement in which the windage created by one gyro produces couples on the other gyro.

Figs. 8 and 9 show an alternative arrangement to Figs. 6 and 7.

Figs. 10 and 11 show details relating to Figs. 6 and 7, Fig. 11 being taken substantially on the line 11—11 of Fig. 6 and the tubes thereof being shown in section along the line 11—11 of Fig. 10.

Figs. 1 and 2 are reproduced in this specification in order to illustrate the general arrangement of one form of gyro compass to which any of the methods of damping described in this specification may be applied. Figs. 1 and 2 show two elevations of the sensitive element of a gyro compass. It consists of a frame 1, having a figure-of-eight shape, on which the gyro 2 is pivotally mounted on the horizontal trunnions 3. The upper loop of the frame carries the gyro 4 mounted pivotally in a gimbal ring 5 on horizontal trunnions 6 the ring 5 being pivotally mounted in the frame 1 on the vertical trunnions 7. The whole sensitive element is suspended on the wire suspension 8.

The upper loop of the frame 1 also carries the ring 9 on two horizontal trunnions 10 which are normally coaxial with the trunnions 6 of gyro 4. The ring 9 is connected to gyro 2 by means of two cranks 11 and 12 and a connecting rod 13 the cranks being pinned to the trunnions on which they are mounted. The ring 9 and gyro 2 thus move together both in azimuth and altitude.

The rotor spindle 14 of the gyro 4 engages in a circular clearance hole 15 in the ring 9 so that the two gyros are only capable of a very small relative motion before the rotor spindle 14 comes in contact with the side of the hole 15 in the ring 9 thus producing equal and oppositely acting friction couples on the two gyros which have a damping effect on the oscillation of the compass.

As above stated, in accordance with my invention, it is necessary for effective damping of two gyro compasses that the couples on the two gyros shall be unequal and opposite or, in other words, that in addition to the mutual interaction of the two gyros an external couple is required in order that both the mutual and relative oscillations shall be eliminated or reduced. I arrange the gyros so that these unequal couples are supplied by interactions between the gyros by which power is taken from one or other rotor, say, by air jets created by the motion of the rotor. These jets are arranged so that normally they form a balanced system of couples on the sensitive element and any relative motion of the two gyros disturbs the balance of the couples, the unbalanced couples being effective in damping the oscillations of the compass.

Figs. 4 and 5 show elevation and plan of the upper gyro of the compass arranged for this purpose.

The gyro case 4 has four holes 4$^a$ through which the gyro rotor can be seen. The ring 9 which tilts in phase with the lower gyro has a ring 18 fixed to it by the brackets 19 and to the ring 18 are fixed four vanes 20, shaped like turbine blades so that they may catch a portion of the jets of air issuing from the holes 4$^a$. These vanes may project into the gyro casing 4 through the four holes 4$^a$ so that the edge of the vane next the rotor catches a portion of the stream of air which is being dragged round by the rotor and this portion on leaving the vane forms a jet of air the reaction of which produces a force on the ring 9 and thence on the lower gyro. If the four blades 20 are symmetrically placed relatively to the gyro rotor the four reactions form a balanced system of forces but any relative motion between the gyros disturbs the balance of the jets leaving an unbalanced couple on each gyro, and if only the four blades 20 were fitted the unbalanced couple on the ring 9 and therefore on the lower gyro would exceed the unbalanced couple on the upper one because the change of momentum which the air experiences in passing through the blades 20 is greater than the momentum on entering the blades and also takes place farther from the trunnion axis hence from both causes the couple on the lower gyro exceeds the couple on the upper gyro.

When couples on the lower gyro are required to be less than those on the upper I may fit four extra blades 22 on a spider 21 as shown in Figs. 4 and 5 which is rigidly attached to the rotor casing 4, the blades 22 being placed relatively to the blades 20 so that they catch the air jets leaving the blades 20 and turn them through a considerable angle. The air thus leaves the blades 22 which are farthest from the trunnion axis and the couple on the upper gyro is therefore greater than that on the lower gyro.

I find that in some arrangements of the two gyros in a two-gyro-compass damping is more effectively produced if the relative motion of the two gyros introduces an external couple on one of the gyros only. For example, one gyro may be free to precess and the other may be forced by external couples to follow the first either in azimuth or in altitude or in both, or one gyro may be forced to follow the other in azimuth and the other forced to follow the one in altitude. Figs. 6 and 7 show elevation and plan of one arrangement I may adopt for making the lower gyro follow the upper one in both azimuth and altitude.

The rotor casing 4 is fitted with two nozzles 24 and 25, the nozzle 24 being vertical and 25 horizontal and passing through the trunnion 6. From both nozzles flow jets of air when the gyro is running. The jet from the nozzle 24 enters a tube 26—27 which is attached to the ring 9 by two brackets 28. The details of the separation between the tubes 26—27 and their disposition relatively to the nozzle 24 are shown more clearly in Figs. 10 and 11; Fig. 11 representing a vertical section through the centre of the nozzle in Fig. 6. From these figures it is clear that the jet from the nozzle 24 is divided between the two tubes 26 and 27 the ends of which are bent as shown. The two jets thus formed leave the tubes 26 and 27 in a horizontal direction as is shown in Fig. 7, and if the jets are equal they produce a balanced system of forces on the ring 9 and thence on the lower gyro. If, however, the gyro case 4 tilts in altitude more air enters 26 than enters 27 and a couple round the vertical axis is produced. The effect of this couple is exerted through the ring 9, trunnions 10 and frame 1 upon the lower gyro 2 producing a torque about the vertical axis of the latter which causes it to precess about its horizontal axis, thus following the movement of the upper gyro in altitude.

A similar arrangement of tubes 29 and 30 also fixed to the ring 9 opposite the nozzle 25 serves to produce on the ring 9 couples round the horizontal trunnion axis 10 due to the fact that more air enters one of the tubes than the other. Movement of the ring 9 will be transmitted through cranks 11 and 12 and link 13 to the horizontal axis of the lower gyro 2 causing the latter to precess about the vertical axis to follow the movement in azimuth.

An alternative arrangement to Figs. 6 and 7 is shown in Figs. 8 and 9 in which the nozzle 24 is rigidly attached to the divided tubes 31 and 32 the end portions of which are bent vertically downwards, and the nozzle 25 is similarly rigidly attached to the divided tubes 33 and 34. Thus when the gyro rotor is revolving equal jets leave the tubes 31 and 32 in a vertical direction downwards and equidistant from the centre of the gyro. These jets pass the two blades 35 and 36, which are fixed to the periphery of the ring 9. Any motion of the gyro case 4 in azimuth relatively to the ring 9 causes more or less air to be caught by one or other of these blades, thus producing a couple on the lower gyro about the horizontal trunnion axis which causes the lower gyro to follow the upper one. The jets from the tubes 33 and 34 impinge horizontally on the blades 37 and 38 which are also attached to ring 9 and serve to make the lower gyro follow the upper in altitude.

Having now particularly described and ascertained the nature of my said invention and in what manner the same is to be performed, I declare that what I claim is:—

1. In a gyroscopic compass, a sensitive element comprising two gyroscopes each having a rotor and a casing therefor provided with apertures through which air jets are caused to issue by the rotation of the rotor, a connection between the gyroscopes for causing them to mutually react upon each other and means actuated by the air jets of one of the gyroscopes for producing unequal couples on the two gyroscopes.

2. In a gyroscopic compass, a sensitive element comprising two gyroscopes each having a rotor and a casing therefor provided with apertures through which air jets are caused to issue by the rotation of the rotor, a connection between the gyroscopes for causing them to mutually react upon each other, means actuated by the air jets of one of the gyroscopes for producing unequal couples on the two gyroscopes and means controlled by the relative movement of the gyroscopes for controlling the first named means.

3. A gyroscopic compass comprising two mutually interacting gyroscopes each having a rotor and a casing therefor provided with apertures through which air jets are caused to issue by rotation of the rotor and means actuated by the air jets of one of the gyroscopes for damping the mutual and relative periods of oscillation of the gyroscopes by unequal couples acting thereon.

4. In a gyroscopic compass, the combination of two gyroscopes each comprising a rotor and a casing therefor provided with apertures through which air jets are caused to issue by the rotation of the rotor, an element for supporting said gyroscopes, one of said gyroscopes being in unstable equilibrium gravitationally, and the other of said gyroscopes being in stable equilibrium gravitationally, the period of the sensitive element being different when one gyroscope is running alone than when the other gyroscope is running alone, a connection between said gyroscopes to cause them to mutually re-act upon each other to damp the oscillations of the sensitive element about a vertical axis and means mounted on the connection and actuated by the air jet of one of the gyroscopes for producing unequal damping couples on the two gyroscopes.

5. In a gyroscopic compass, the combination of a frame, a suspension therefor, two gyroscopes mounted in the frame and each consisting of a rotor and a casing provided with apertures through which air jets are caused to issue by the rotation of the rotor, a member mounted in the frame and operatively connected to the rotor axis of one of the gyroscopes, a connection between the member and the other gyroscope and means mounted on the member and actuated by the air jets of one of the gyroscopes for producing unequal damping couples on the two gyroscopes.

6. In a gyroscopic compass, the combination of a frame, a suspension therefor, two gyroscopes mounted in the frame and each consisting of a rotor and a casing provided with apertures through which air jets are caused to issue by the rotation of the rotor, a member mounted in the frame and operatively connected to the rotor axis of one of the gyroscopes, a connection between the member and the other gyroscope and a plurality of vanes mounted on the member and coacting with the air jets of one of the gyroscopes for producing unequal damping couples on the two gyroscopes.

7. In a gyroscopic compass, the combination of a frame, two gyroscopes mounted in the frame and each having a rotor and a casing therefor provided with apertures through which air jets are caused to issue by the rotation of the rotor and means actuated by the air jets of one of the gyroscopes for producing an external couple upon the other gyroscope.

8. In a gyroscopic compass, the combination of a frame, two gyroscopes mounted in the frame and each having a rotor and a casing therefor provided with apertures through which air jets are caused to issue by the rotation of the rotor, means actuated by the air jets of one of the gyroscopes for producing an external couple upon the other gyroscope and means dependent upon the relative movement between the gyroscopes for controlling the first named means.

Dated this 6th day of October, 1919.

JAMES BLACKLOCK HENDERSON.